US008819799B2

(12) United States Patent
Oguma et al.

(10) Patent No.: US 8,819,799 B2
(45) Date of Patent: Aug. 26, 2014

(54) IMAGE FORMING APPARATUS, IMAGE FORMING SYSTEM, AND METHOD FOR REALIZING PSEUDO SINGLE SIGN-ON

(71) Applicant: KYOCERA Document Solutions Inc., Osaka (JP)

(72) Inventors: Takashi Oguma, Osaka (JP); Shingo Ueno, Osaka (JP); Rie Kasai, Osaka (JP); Toshihide Higashimori, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/669,011

(22) Filed: Nov. 5, 2012

(65) Prior Publication Data
US 2013/0117835 A1    May 9, 2013

(30) Foreign Application Priority Data

Nov. 5, 2011   (JP) ................................ 2011-242936
Nov. 5, 2012   (EP) .................................... 12191286

(51) Int. Cl.
G06F 7/04        (2006.01)
H04L 29/06       (2006.01)
G06F 21/41       (2013.01)

(52) U.S. Cl.
CPC .......... *H04L 63/0815* (2013.01); *H04L 63/083* (2013.01); *G06F 21/41* (2013.01)
USPC ......................................................... 726/8

(58) Field of Classification Search
CPC .............. H04L 63/0815; H04L 63/101; H04L 63/0884; H04L 63/08; H04L 63/083; G06F 21/41
USPC .......................................................... 726/8
See application file for complete search history.

(56) References Cited

U.S. PATENT DOCUMENTS 8,312,540 B1 *   11/2012   Kahn et al. ...................... 726/22
2001/0000358 A1   4/2001   Isomichi et al.

(Continued)

FOREIGN PATENT DOCUMENTS

| GB | 2355827     | 5/2001 |
| JP | 2003-273868 | 9/2003 |
| JP | 2005-062556 | 3/2005 |
| JP | 2008-186201 | 8/2008 |
| WO | 0172009     | 9/2001 |

(Continued)

OTHER PUBLICATIONS

European Search Report for corresponding EP Appl. No. 12191286.9, dated Mar. 25, 2013.

*Primary Examiner* — Eleni Shiferaw
*Assistant Examiner* — Gregory M Elmore
(74) *Attorney, Agent, or Firm* — McDonnell Boehnen Hulbert & Berghoff LLP

(57) ABSTRACT

An image forming apparatus includes: an internal authentication information storage unit that stores user authentication information relating to authentication for the image forming apparatus; an internal user authentication unit; an external authentication information storage unit that stores the user authentication information for external authentication, and a private IP address in association with one another for a plurality of URLs for external authentication; and a pseudo single sign-on unit that when it is determined that a redirection destination URL included in a response message transferred from a cloud server matches one of the stored plurality of URLs for external authentication, reads the user identification information for external authentication relating to the private IP address corresponding to a destination IP address included in a packet of the response message from the external authentication information storage unit, transmits the information for external authentication to the redirection destination URL, and performs the sign-on process.

8 Claims, 7 Drawing Sheets

(56) References Cited

U.S. PATENT DOCUMENTS

2005/0039054 A1   2/2005  Satoh et al.
2006/0185021 A1*  8/2006  Dujari et al. .................... 726/27
2009/0249439 A1*  10/2009  Olden et al. ...................... 726/1
2011/0277026 A1*  11/2011  Agarwal et al. ................... 726/8

FOREIGN PATENT DOCUMENTS

| WO | 2008/024454 | | 2/2008 | |
| WO | 2008/114256 | | 9/2008 | |
| WO | 2009/039160 | | 3/2009 | |
| WO | WO2009039160 | * | 3/2009 | ............. G06F 15/00 |

* cited by examiner

| URL No. | URL FOR EXTERNAL AUTHENTICATION |
|---|---|
| 0 | URL0 |
| 1 | URL1 |
| 2 | URL2 |

| UID | PW | IPA | UID1 | PW1 | UID2 | PW2 | UID3 | PW3 |
|---|---|---|---|---|---|---|---|---|
| user00 | pw00 | ipa0 | user10 | pw10 | NULL | NULL | user30 | pw30 |
| user01 | pw01 | ipa1 | user11 | pw11 | user21 | pw21 | user31 | pw31 |
| user02 | pw02 | ipa2 | NULL | NULL | user22 | pw22 | user32 | pw32 |
| ⋮ | ⋮ | ⋮ | ⋮ | ⋮ | ⋮ | ⋮ | ⋮ | ⋮ |

IMAGE FORMING APPARATUS, IMAGE FORMING SYSTEM, AND METHOD FOR REALIZING PSEUDO SINGLE SIGN-ON

INCORPORATION BY REFERENCE

This application is based upon, and claims the benefit of priority from, corresponding Japanese Patent Application No. 2011-242936, filed in the Japan Patent Office on Nov. 5, 2011 and European Patent Application No. EP12191286.9, filed on Nov. 5, 2012, the entire contents of both of which are incorporated herein by reference.

FIELD

The present disclosure relates to an image forming apparatus, an image forming system, and a method for performing pseudo single sign-on for each of a plurality of URLs for external authentication.

BACKGROUND

Generally, cloud services provide different service types and charge different fees. Since a user often uses a plurality of cloud services, based in part on the service type and fee, the user needs to undergo authentication for each cloud service, which can be troublesome since each could service requires authentication. If the same password is used for authentication across multiple cloud services in an attempt to alleviate the difficulty, security deteriorates.

In order to avoid such difficulty, systems are known that use single sign-on that enables the user who has undergone a specific kind of authentication to skip other kinds of authentication that may be required.

Typical authentication methods that utilize single sign-on include "reverse proxy authentication" and "agent module authentication." Both of these authentication methods may cooperate with a plurality of servers that provide cloud services.

In reverse proxy authentication, an authentication server that receives a first-time authentication request from the user is utilized. When the first-time authentication is successful on the authentication server, the authentication server issues access tickets to a plurality of cloud servers that provide cloud services and transmits the access tickets to the user.

In agent module authentication, authentication software called "agent" that performs an authentication substitution process is installed in each of the plurality of cloud servers that provide the cloud services, and an authentication server that receives the first-time authentication request from the user is also utilized. When the first-time authentication is successful on the authentication server, the authentication server issues access tickets to the plurality of cloud servers and transmits the access tickets. The "agent" verifies authenticity of the access ticket by querying a back-end server.

Reverse proxy authentication and agent module authentication, described above, necessitate the use of an authentication server, a back-end server, authentication software, the issuance of an access ticket, and the like, which may complicate the authentication process.

SUMMARY

The present disclosure relates to an image forming apparatus, an image forming system, and a method for realizing pseudo single sign-on by using a simple configuration.

According to one embodiment of the present disclosure, an image forming apparatus is disclosed. The image forming apparatus includes: an internal authentication information storage unit that stores user authentication information relating to authentication for the image forming apparatus. The user authentication information is associated with a user of the image forming apparatus. The image forming apparatus also includes an internal user authentication unit that performs a sign-on process with respect to the image forming apparatus based on the user authentication information; an external authentication information storage unit that stores the user authentication information for external authentication, and a private IP address in association with one another for each of a plurality of URLs for external authentication; and a pseudo single sign-on unit that, when it is determined that a redirection destination URL included in a response message transferred from a cloud server matches at least one of the stored plurality of URLs for external authentication, reads the user identification information for external authentication relating to the private IP address corresponding to a destination IP address included in a packet of the response message from the external authentication information storage unit, transmits the information for external authentication to the redirection destination URL, and performs the sign-on process.

According to another embodiment of the present disclosure, an image forming system is disclosed. The image forming system includes: an image forming apparatus communicatively coupled to an intranet, and an agent server communicatively coupled between the intranet and the Internet. The image forming apparatus includes: an internal authentication information storage unit that stores user authentication information relating to authentication for the image forming apparatus. The user authentication information is associated with a user of the image forming apparatus. The image forming apparatus also includes an internal user authentication unit that performs a sign-on process with respect to the image forming apparatus based on the user authentication information. The agent server includes: an external authentication information storage unit that stores the user, information for external authentication, and a private IP address in association with one another for each of a plurality of URLs for external authentication; and a pseudo single sign-on unit that, when it is determined that a redirection destination URL included in a response message transferred from a cloud server matches at least one of the stored plurality of URLs for external authentication, reads the user authentication information for external authentication relating to the private IP address corresponding to a destination IP address included in a packet of the response message from the external authentication information storage unit, transmits the information for external authentication to the redirection destination URL, and performs the sign-on process.

According to yet another embodiment of the present disclosure, a method of realizing a pseudo single sign-on performed for a cloud service within a cloud server is disclosed. The method includes: storing user authentication information relating to authentication for an image forming apparatus. The user authentication information is associated with a user of the image forming apparatus. The method also includes performing a sign-on process with respect to the image forming apparatus based on the user authentication information; storing the user authentication information for external authentication, and a private IP address in association with one another for each of a plurality of URLs for external authentication; determining that a redirection destination URL included in a response message transferred from the cloud server matches at least one of the stored plurality of URLs for external authentication; reading the information for external authentication relating to the private IP address corresponding to a destination IP address included in a packet of the response message; and transmitting the information for external authentication to the redirection destination URL and performing the sign-on process.

Additional features and advantages are described herein, and will be apparent from the following Detailed Description and the figures.

BRIEF DESCRIPTION OF FIGURES

In the accompanying drawings:

FIG. 4A is a schematic diagram illustrating an example of a URL table for cloud service authentication.

FIG. 4B is a schematic diagram illustrating an example of an authentication information table.

DETAILED DESCRIPTION

First Embodiment

Figure 1:
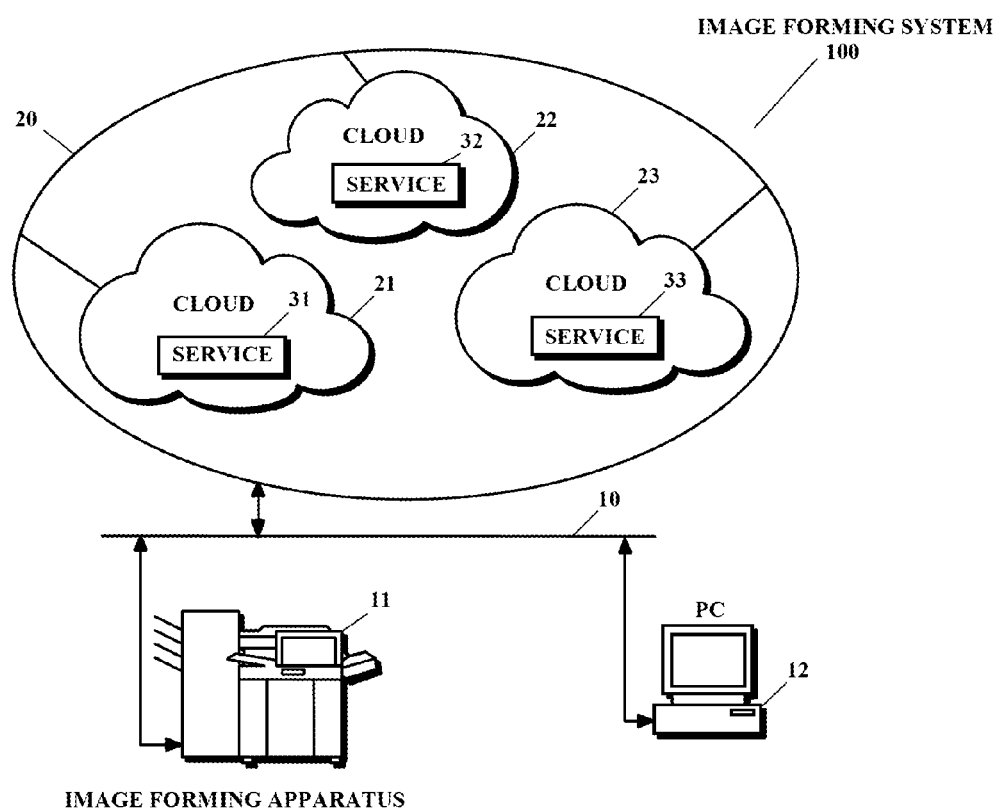
FIG. 1 is a schematic diagram illustrating a configuration of an image forming system according to a first embodiment of the present disclosure.

FIG. 1 is a schematic diagram illustrating the configuration of an image forming system 100 according to a first embodiment of the present disclosure.

The image forming system 100 includes an image forming apparatus 11 communicatively coupled to an intranet 10 and a personal computer (PC) 12 that serves as a terminal device. The intranet 10 is communicatively coupled to the Internet 20 via a router (not illustrated). A plurality of cloud servers 21, 22, 23 are communicatively coupled to the Internet 20, and include cloud services 31, 32, 33, respectively, to be provided to a user. The user may use basic services (e.g., copy, print, and facsimile) of the image forming apparatus 11 through the PC 12 via the intranet 10, and also use cloud services 31, 32, 33 via extended applications provided to the image forming apparatus 11. In some examples, the image forming system 100 may include more than one PC and one image forming apparatus, and may include more than three cloud servers and cloud services.

Figure 2:
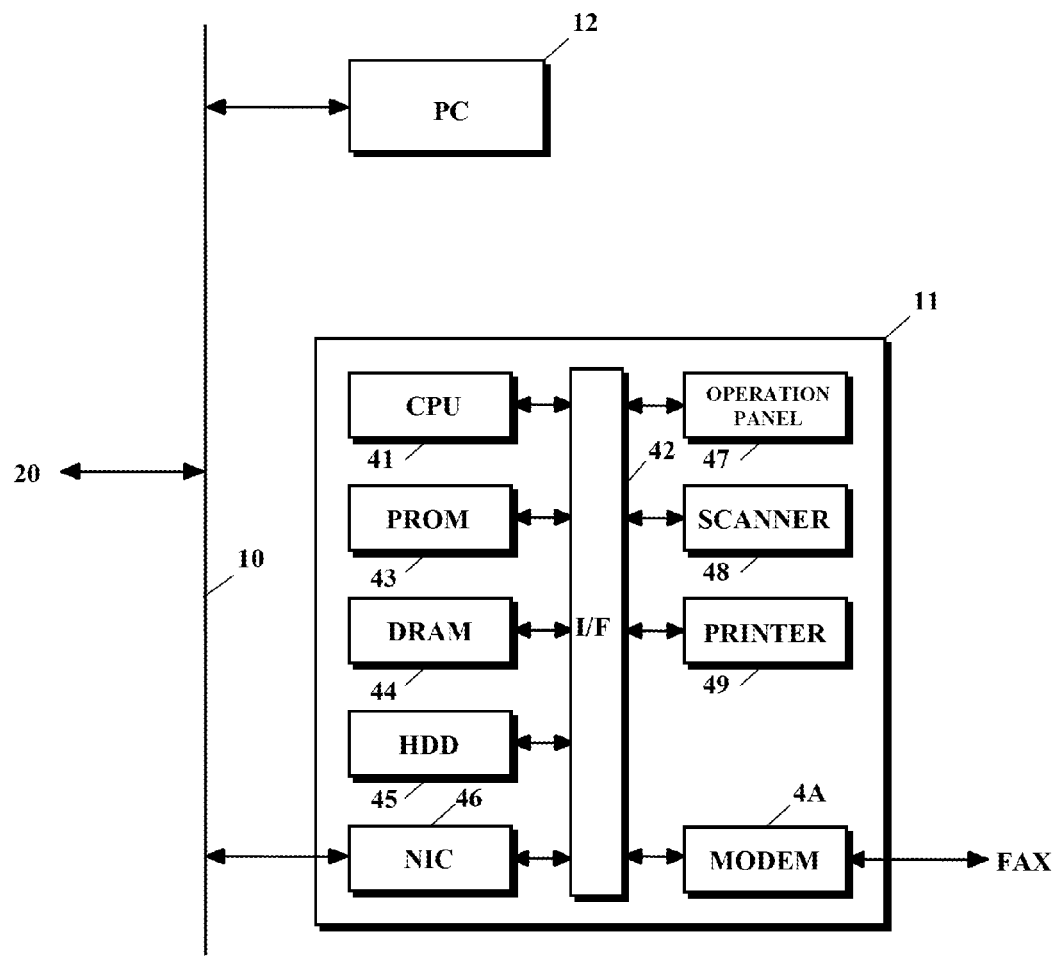
FIG. 2 is a block diagram illustrating a configuration of hardware of an image forming apparatus included in the image forming system.

FIG. 2 is a block diagram illustrating the configuration of hardware of the image forming apparatus 11 included in the image forming system 100.

In the image forming apparatus 11, a CPU 41 is coupled to a PROM 43, a DRAM 44, a hard disk drive (HDD) 45, a network interface card (MC) 46, an operation panel 47, a scanner 48, a printer 49, and a FAX modem 4A via an interface 42. In FIG. 2, for the sake of simplicity, a plurality of interfaces are represented by the interface 42.

The PROM 43 may be, for example, a flash memory, and store a basic input/output system (BIOS), an operating system (OS), various drivers, and a basic application that causes the image forming apparatus 11 to function as an image forming apparatus. The DRAM 44 is used as a main storage device. The hard disk drive 45 stores print data, image data read by the scanner 48, facsimile reception data, and any extended application that may be used by the image forming apparatus. The NIC 46 is coupled to the intranet 10. The operation panel 47 includes an input unit and a display unit. The scanner 48 generates an image file, and the image file is used for printing, facsimile transmission, or file transmission. The printer 49 includes a print engine, a sheet feeding unit for paper, a transport unit, and a sheet delivery unit (not shown). To print an image, bitmap data generated in the DRAM 44 is supplied to the print engine. An electrostatic latent image is formed on a photoconductor drum based on the bitmap data, and is developed with toner to form a toner image. The toner image is transferred onto paper and fixed thereto.

Figure 3:
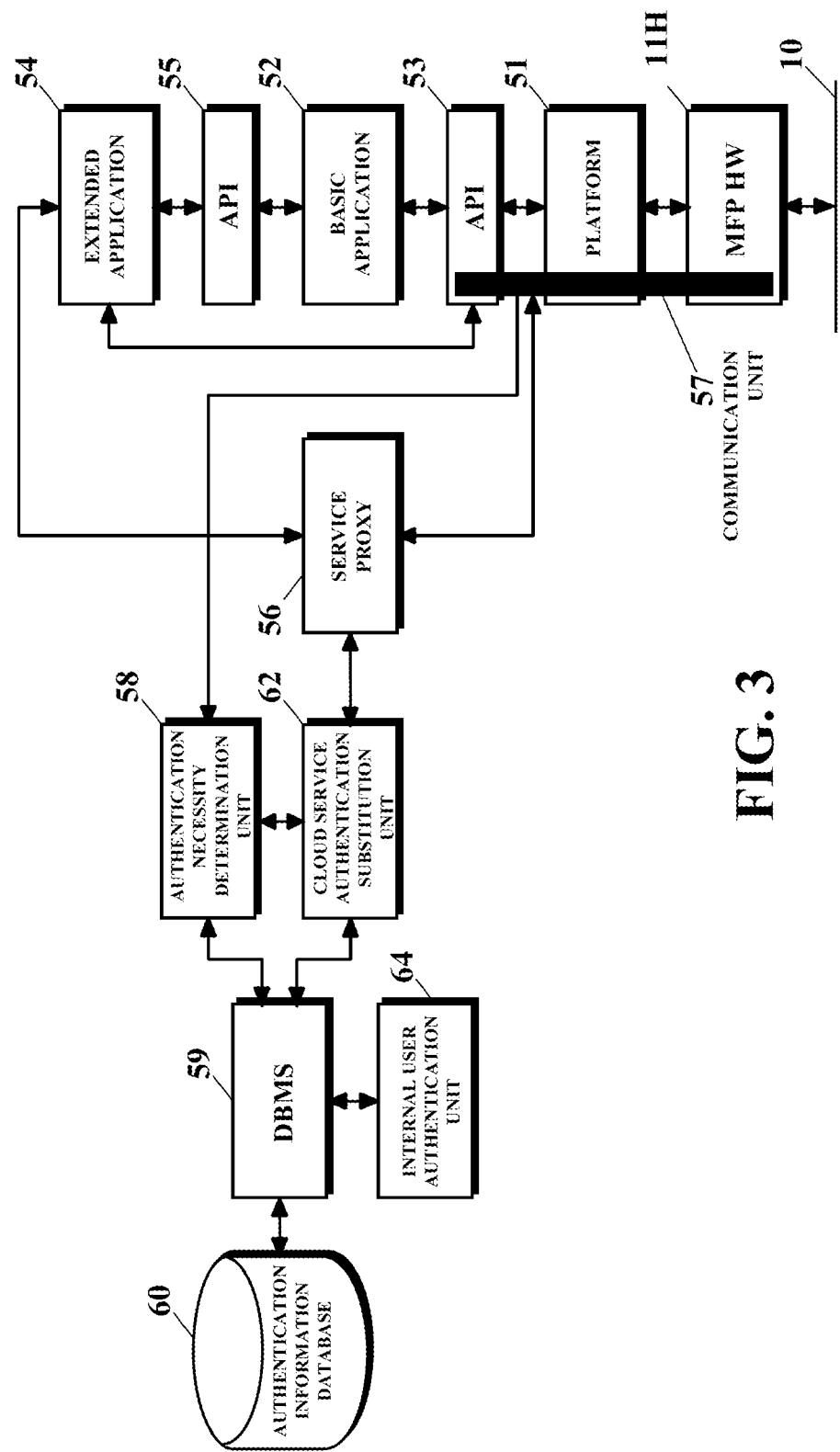
FIG. 3 is a block diagram illustrating a configuration of software of the image forming apparatus.

FIG. 3 is a block diagram illustrating an example configuration of software of the image forming apparatus 11.

Platform 51 includes an OS that controls hardware 11H of the image forming apparatus 11 and manages a power supply and the like, a standard library on the OS, and an execution environment such as a Java virtual machine (JVM) on the OS. Basic application 52 includes application programs for copying, printing, facsimile, and the like, which use functions of platform 51 via API 53. Extended application 54 is created and installed by a third vendor or the user. Extended application 54 uses the basic application 52 via an API 55, and uses the functions of the platform 51 via the API 53. Further, the extended application 54 uses the cloud services 31, 32, 33 via a service proxy 56 and a communication unit 57.

Service proxy 56 is a proxy class corresponding to the cloud services 31, 32, 33. The service proxy 56 is created by using a Web Services Description Language (WSDL) tool (program) based on a WSDL file of the cloud services 31, 32, 33, and causes the cloud services 31, 32, 33 to be handled in the same manner as an internal method when viewed from the extended application 54. The service proxy 56 includes a service method call API for each of the cloud services 31, 32, 33, and the service method call API includes an API for the authentication as well.

The communication unit 57 includes the NIC 46 illustrated in FIG. 2, a TCP/IP protocol processing unit included in the OS of the platform 51 (not shown), and an XML serializer and an XML deserializer included in the standard library of the platform 51 (not shown).

An internal user authentication unit 64 performs a sign-on process with respect to the image forming apparatus based on user authentication information. An authentication necessity determination unit 58 determines the necessity of any further authentication before start of use of a cloud service based on contents of a packet and contents of a URL table 61 for cloud service authentication, illustrated in FIG. 4A. The contents of the URL table 61 is read from an authentication information database 60 via a database management system (DBMS) 59. In FIG. 3 authentication information database 60 may be an internal authentication information storage unit or an external authentication information storage unit.

More specifically, for example, a SOAP over HTTP protocol is used between each of the cloud services 31, 32, 33 and the communication unit 57, and the authentication necessity determination unit 58 determines the necessity of the authentication based on a status number of a response line (header) of an HTTP response message thereto.

FIG. 4A shows a schematic diagram illustrating the example of the URL table 61 for cloud service authentication. The URLs for external authentication for the cloud services 31, 32, 33 are each associated with a URL identification number (URL No). The URL table 61 for cloud service authentication is manually created in advance.

Figure 5:
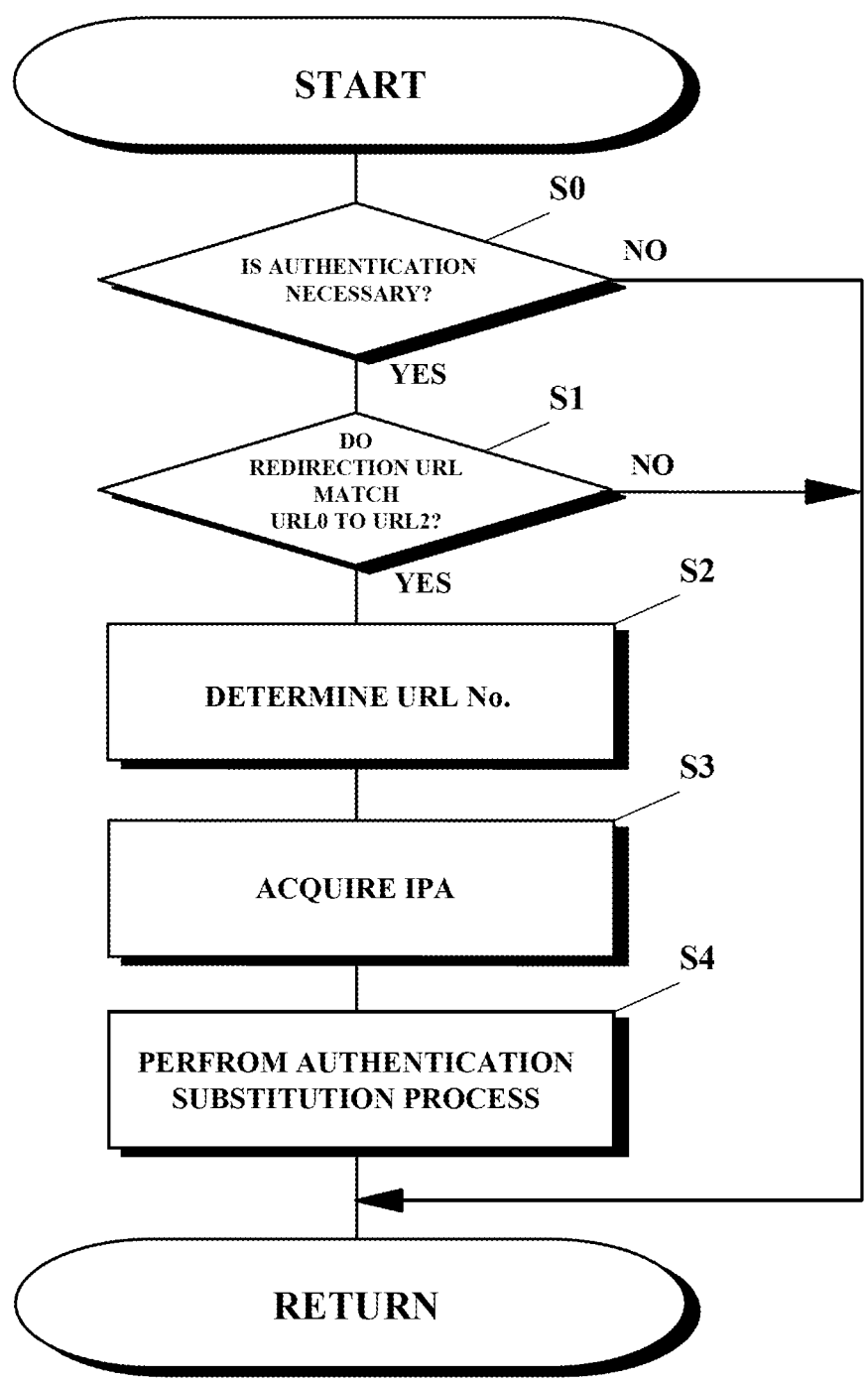
FIG. 5 is a flowchart illustrating authentication substitution process performed by the image forming apparatus.

FIG. 5 shows a flowchart illustrating authentication substitution process performed by the image forming apparatus 11. The authentication process is performed by the authentication necessity determination unit 58 and a cloud service authentication substitution unit 62 of the image forming apparatus 11 that are illustrated in FIG. 3. The authentication necessity determination unit 58 performs the authentication substitution process each time the communication unit 57 receives a packet.

The authentication substitution process begins at step S0 to determine whether authentication is necessary. At S0, when the received packet includes the response line of the HTTP response message and when the status number of the response line is a specific number (for example, 401) indicating that the authentication has not been performed yet, it is determined that the authentication is necessary. When it is determined that authentication is necessary, the procedure advances to step S1. Alternatively, when it is determined that authentication is not necessary, the authentication substitution process is brought to an end.

After it is determined that authentication is necessary, the substitution process proceeds to step S1. At step S1, the authentication necessity determination unit 58 acquires a value of Location within the header of the response line of the HTTP response message as a redirection URL, and determines whether or not the redirection URL matches any one of URLs (URL0 to URL2) for external authentication within the URL table 61 for cloud service authentication. When one of the URLs matches, the procedure advances to step S2. If no match is determined, the authentication substitution process is brought to an end.

At step S2, the authentication necessity determination unit 58 determines the URL identification number (URL No).

At step S3 the authentication necessity determination unit 58 acquires a destination IP address (IPA) included in the received packet. The destination IP address (IPA) represents a private IP address into which a pair of a global IP address and a port number are converted by the router. The communication unit 57 issues an HTTP request to the above-described URL.

FIG. 4B shows a schematic diagram illustrating the example of an authentication information table 63. The authentication information database 60 stores the URL table 61 for cloud service authentication illustrated in FIG. 4A and the authentication information table 63.

The authentication information table 63 stores an ID and a password that are used for authentication of the image forming apparatus 11 (i.e., required to use the image forming apparatus 11) as "UID" and "PW", respectively, for each user.

The authentication information table 63 also stores the private IP address (and, for example, the MAC address) assigned to the PC 12 within the intranet 10 as the destination IPA for each user. In addition, the authentication information table 63 stores, for each user, a user ID and a password that are required in use of the cloud service 31 as "UID1" and "PW1", respectively, a user ID and a password that are required in use of the cloud service 32 as "UID2" and "PW2", respectively, and a user ID and a password that are required in use of the cloud service 33 as "UID3" and "PW3", respectively.

The value "NULL" shown within the authentication information table 63 indicates that there is no authentication information associated with the respective cloud service (e.g., cloud service 31, 32, or 33), or in other words, that the user cannot use the corresponding cloud service. For example, in FIG. 4B, the user whose UID is "user00" has "NULL" as UID2 and PW2, and therefore cannot use the cloud service 32. In the same manner, the user whose UID is "user02" has "NULL" as UID1 and PW1, and therefore cannot use the cloud service 31. Authentication information table 63 is manually created in advance.

Returning to FIG. 5, at step S4, the authentication substitution process is performed. To do so, the authentication necessity determination unit 58 transfers "URLi", "i", and "ipai" (in the first embodiment, i is equal to any one of 1 to 3), which correspond to the values of the redirection URL, the URL No, and the destination IPA, respectively, to the cloud service authentication substitution unit 62 to transfer control to the cloud service authentication substitution unit 62. Using the value "ipai" of the destination IPA and the value "i" of the URL No as key values, the cloud service authentication substitution unit 62 reads, via the database management system 59, the value "useri" of the user ID (UIDi) and the value (PWi) "pwi" of the password, which are required to use the cloud services 31, 32, 33, and which correspond to the key values, from the authentication information table 63 included in the authentication information database 60. The cloud service authentication substitution unit 62 uses "useri" and "pwi" to perform the authentication substitution process in response to a SOAP response message received from a redirection destination URL.

Figure 6:
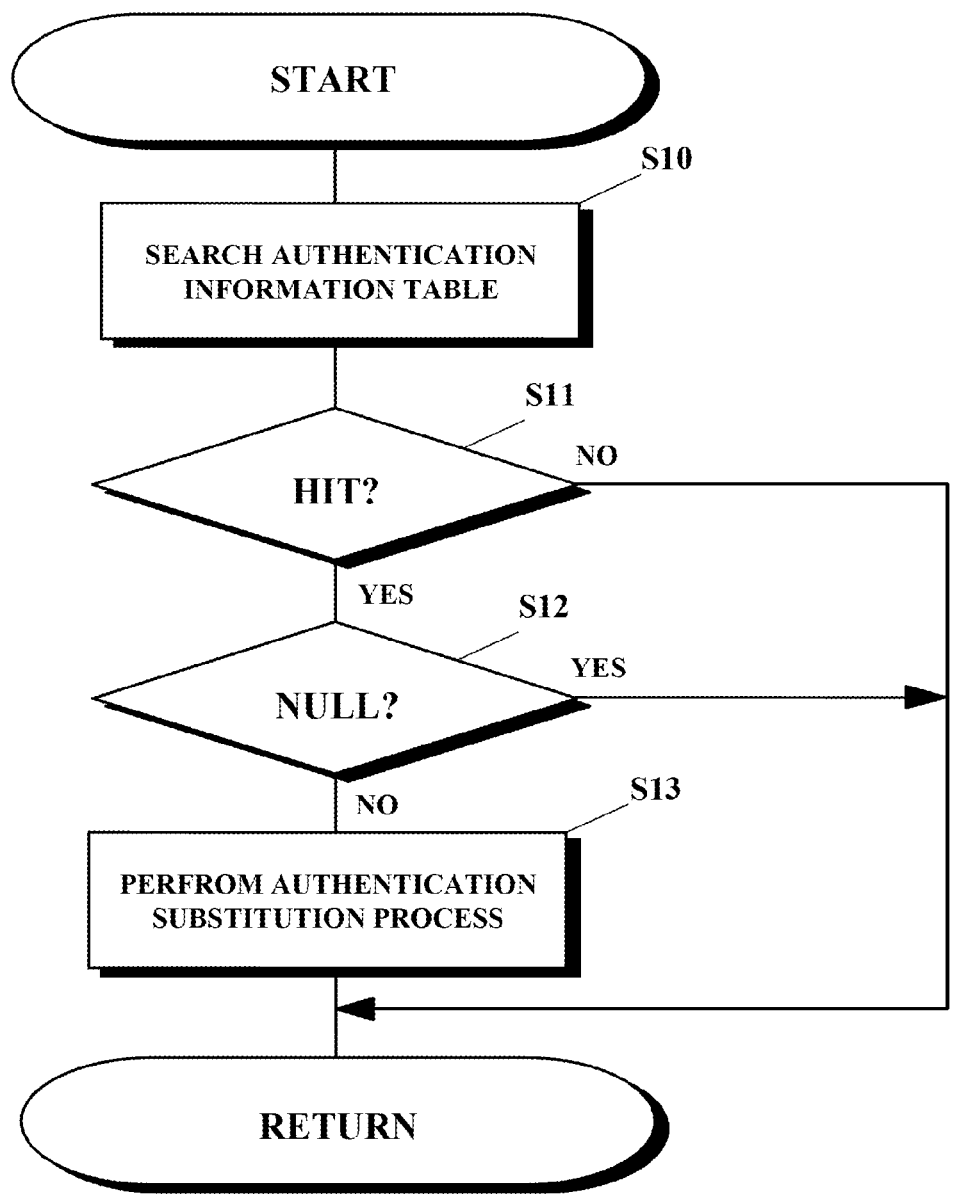
FIG. 6 is a flowchart illustrating process performed by a cloud service authentication substitution unit included in the image forming apparatus.

FIG. 6 shows a flowchart illustrating the process performed by the cloud service authentication substitution unit 62 included in the image forming apparatus 11.

At step S10, the cloud service authentication substitution unit 62 searches the authentication information table 63 by using the value "ipai" of the IPA received from the authentication necessity determination unit 58 as a key value.

At step S11, the cloud service authentication substitution unit 62 determines whether or not the search from the previous step, step s10, returns a hit (i.e., returns a value). When there is a hit in the search for the value "useri" of the UIDi and the value "pwi" of the PWi which correspond to the value "ipai" of the IPA, the procedure advances to Step S12. When no value is returned, the process ends.

At step S12, the cloud service authentication substitution unit 62 reads the value "useri" of the UIDi and the value "pwi" of the PWi that correspond to the URL No. Unless the value "useri" of the UIDi and the value "pwi" of the PWi that have been read are "NULL", the procedure advances to Step S13. If the values are "NULL", the process ends.

At step S13, the cloud service authentication substitution unit 62 uses the value "useri" of the UIDi and the value "pwi" of the PWi that have been read to perform authentication substitution process in response to the above-described SOAP response message. Once the authentication is complete the process ends.

Process corresponding to results of the authentication and process performed after the authentication are performed by the extended application 54 via the service proxy 56.

According to the first embodiment, the authentication information database 60 of the image forming apparatus 11 stores the URL table 61 and the authentication information table 63—as illustrated in FIG. 4A and FIG. 4B, respectively—for cloud service authentication. When determining that the redirection destination URLs included in response messages received from the cloud services 31, 32, 33 match any one of the URLs for external authentication within the URL table 61 for cloud service authentication, the cloud service authentication substitution unit 62 reads the user IDs (values of the UIDi) and the passwords (values of the PWi) which are required in use of the cloud services 31, 32, 33, which are included in the packets of the response messages, and which are associated with the IPA of the PC 12, from the authentication information table 63. The values of the UIDi and the values of the PWi, which have been read are transmitted to the redirection destination URL and subjected to sign-on process, and hence it is not necessary to include an authentication server back-end server, authentication software, and a unit that issues an access ticket, which are used for reverse proxy authentication or agent module authentication, thereby simplifying the configuration.

Further, it is possible to use a different complicated password (value of the PWi) for each of the cloud services 31, 32, 33, which may improve security.

In addition, each user does not need to record the password (value of the PWi), which simplifies password management and may improve security.

Further, when determining that the response messages received from the cloud services 31, 32, 33 do not include the specific number indicating that the authentication has not been performed yet, the authentication necessity determination unit 58 does not need to perform additional processes relating to the authentication, which may simplify the configuration of the software.

Second Embodiment

Figure 7:
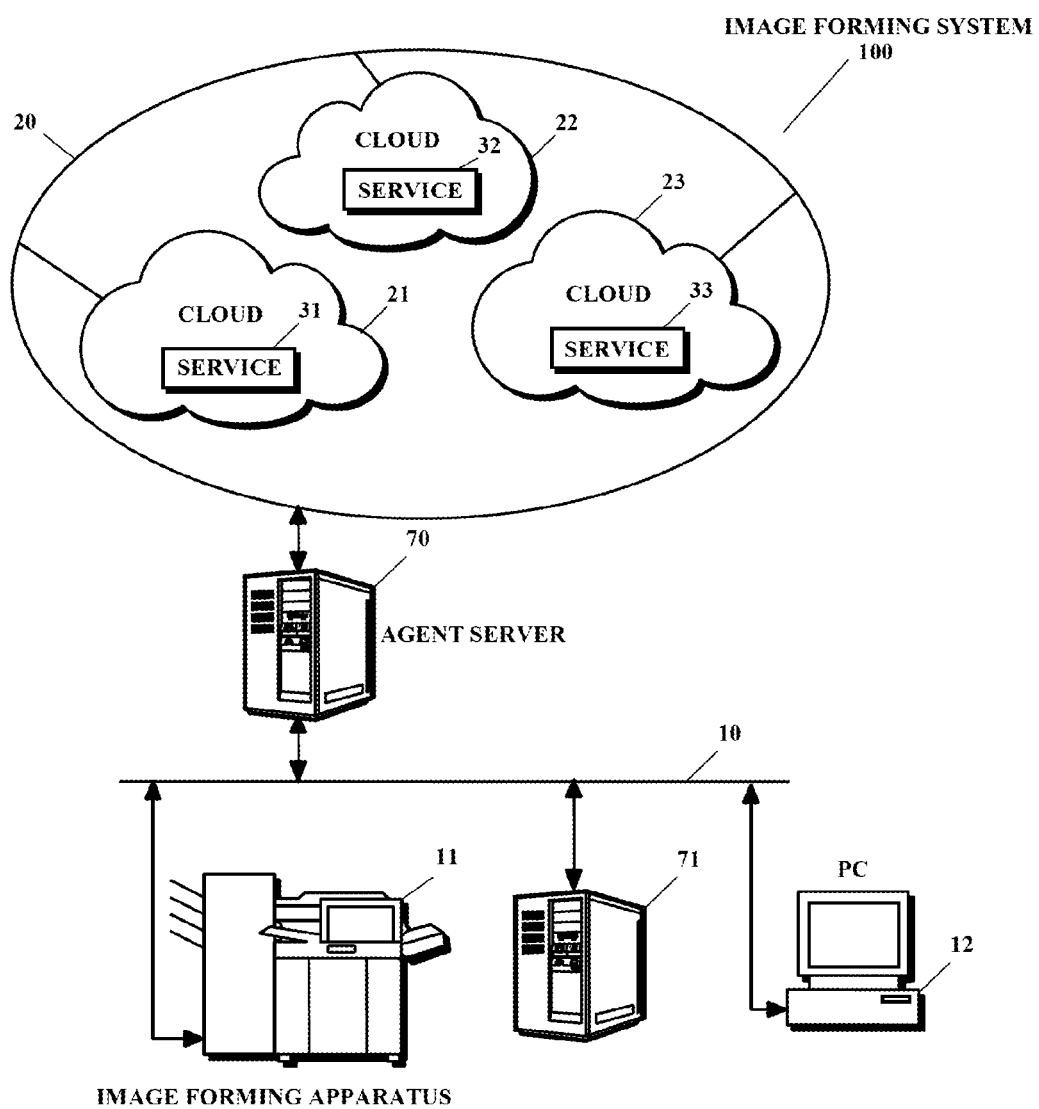
FIG. 7 is a schematic diagram illustrating a configuration of an image forming system according to a second embodiment of the present disclosure.

FIG. 7 is a schematic diagram illustrating the configuration of an image forming system according to a second embodiment of the present disclosure.

In the second embodiment, an agent server 70 is communicatively coupled between an intranet 10 and the Internet 20. The agent server 70 includes the authentication necessity determination unit 58, the database management system 59, the authentication information database 60, and the cloud service authentication substitution unit 62 that are illustrated in FIG. 3. The agent server 70 is constructed by using, for example, a proxy server.

The intranet 10 is also communicatively coupled to a server 71. The server 71 has a function of a file server, and includes a storage device that stores a software development kit (SDK) for developing an extended application 54. The SDK is downloaded from the server 71 and used to develop the extended application 54 on a PC 12. The cloud services 31, 32, 33 can also be used in a development stage of the extended application 54, and hence the process is performed by the authentication necessity determination unit 58 and the cloud service authentication substitution unit 62 also in the above-described stage.

The other configuration of the second embodiment is the same as the configuration of the first embodiment.

The present disclosure of the embodiment includes various other embodiments. For example, other designs may be used in which the above-described components are each present.

For example, step S0 of FIG. 5, performed by the authentication necessity determination unit 58 may be omitted. Further, the protocol between the cloud services 31, 32, 33 and the communication unit 57 may include not only a SOAP, but also a protocol such as a representational state transfer (REST) or an XML-remote procedure call (RPC).

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus that is communicatively coupled to an intranet and a terminal device, wherein the intranet is communicatively coupled to the Internet and a cloud service in a cloud server via a router, comprising:

an extended application that causes a user through the terminal device to use the cloud service in the cloud server;

an internal authentication information storage unit that stores first user authentication information for internal authentication relating to authentication for the image forming apparatus, wherein the first user authentication information is associated with the user;

an internal user authentication unit that performs an internal sign-on process with respect to the image forming apparatus based on the first user authentication information;

an external authentication information storage unit that stores second user authentication information for external authentication relating to authentication for the cloud service and a private IP address that is assigned to the terminal device in the intranet as a destination IP address for the user, in association with one another for each of a plurality of URLs for the external authentication;

an authentication necessity determination unit that determines, when a response message corresponding to the request being issued to the plurality of URLs includes information indicating that the authentication has not been performed yet, whether a redirection destination URL included in the response message transferred from the cloud server matches at least one of the plurality of URLs for the external authentication stored in the external authentication information storage unit; and a cloud service authentication substitution unit that i) reads from the external authentication information storage unit, if the redirection destination URL matches at least one of the plurality of URLs, the second user authentication information for the external authentication relating to the private IP address into which a pair of a global IP address and a port number are converted by the router in the response message, ii) transmits the second user authentication information for the external authentication to the redirection destination URL, and iii) performs an external sign-on process with respect to the cloud service.

2. The image forming apparatus according to claim 1, wherein the information indicating that the authentication has not been performed yet includes a status number included in a response line of the response message by using a SOAP over an HTTP protocol.

3. The image forming apparatus according to claim 2, wherein the redirection destination URL includes a value of Location included in a header of the response message.

4. An image forming system, comprising:

an image forming apparatus coupled to an intranet;

a terminal device coupled to the intranet, wherein the intranet is communicatively coupled to the Internet and a cloud service in a cloud server via a router;

an agent server communicatively coupled between the intranet and the Internet; and a server that includes a software development kit (SDK) downloaded onto the terminal device when an extended application to be installed in the image forming apparatus is developed on the terminal device, the image forming apparatus comprising:

the extended application that causes a user through the terminal device to use the cloud service in the cloud server; and an internal user authentication unit that performs an internal sign-on process with respect to the image forming apparatus based on first user authentication information; the agent server comprising:

an internal authentication information storage unit that stores the first user authentication information for internal authentication relating to authentication for the image forming apparatus, wherein the first user authentication information is associated with the user;

an external authentication information storage unit that stores second user authentication information for external authentication relating to authentication for the cloud service and a private IP address that is assigned to the terminal device in the intranet as a destination IP address for the user, in association with one another for each of a plurality of URLs for the external authentication;

an authentication necessity determination unit that determines, when a response message corresponding to the request being issued to the plurality of URLs includes information indicating that the authentication has not been performed yet, whether a redirection destination URL included in the response message transferred from the cloud server matches at least one of the plurality of URLs for the external authentication stored in the external authentication information storage unit: and a cloud service authentication substitution unit that i) reads from the external authentication information storage unit, if the redirection destination URL matches at least one of the plurality of URLs, the second user authentication information for the external authentication relating to the private IP address into which a pair of a global IP address and a port number are converted by the router in the response message, ii) transmits the second user authentication information for the external authentication to the redirection destination URL, and iii) performs an external sign-on process with respect to the cloud service.

5. The image forming system according to claim 4, wherein the information indicating that the authentication has not been performed yet includes a status number included in a response line of the response message by using a SOAP over an HTTP protocol.

6. The image forming system according to claim 5, wherein the redirection destination URL includes a value of Location included in a header of the response message.

7. A method of causing a user to perform sign-on for a cloud service in a cloud server and to use the cloud service through a terminal device, wherein an intranet is communicatively coupled to the Internet and the cloud service via a router, the method comprising:

storing first user authentication information for internal authentication relating to authentication for an image forming apparatus, wherein the first user authentication information is associated with the user;

performing internal sign-on process with respect to the image forming apparatus based on the first user authentication information;

storing second user authentication information for external authentication relating to authentication for the cloud service, and a private IP address that is assigned to the terminal device in the intranet as a destination IP address for the user, in association with one another for each of a plurality of URLs for the external authentication;

determining, when a response message corresponding to the request being issued to the plurality of URLs includes information indicating that the authentication has not been performed yet, whether a redirection destination URL included in the response message transferred from the cloud server matches at least one of the plurality of URLs for the external authentication stored in the external authentication information storage unit;

reading from the external authentication information storage unit, if the redirection destination URL matches at least one of the plurality of URLs, the second user authentication information for the external authentication relating to the private IP address corresponding to a destination IP address into which a pair of a global IP address and a port number are converted by the router in the response message;

transmitting the second user authentication information for external authentication to the redirection destination URL; and performing an external sign-on process with respect to the cloud service.

8. The method according to claim 7, wherein:

the information indicating that the authentication has not been performed yet includes a status number included in a response line of the response message by using a SOAP over an HTTP protocol; and the redirection destination URL includes a value of Location included in a header of the response message.

* * * * *